July 28, 1953  G. A. MAHER  2,646,689
BELT PULLEY

Filed March 7, 1946  3 Sheets-Sheet 1

INVENTOR.
GEORGE A. MAHER.
BY
Bates, Teare & McBean
Attorneys.

July 28, 1953     G. A. MAHER     2,646,689
BELT PULLEY
Filed March 7, 1946                     3 Sheets-Sheet 2
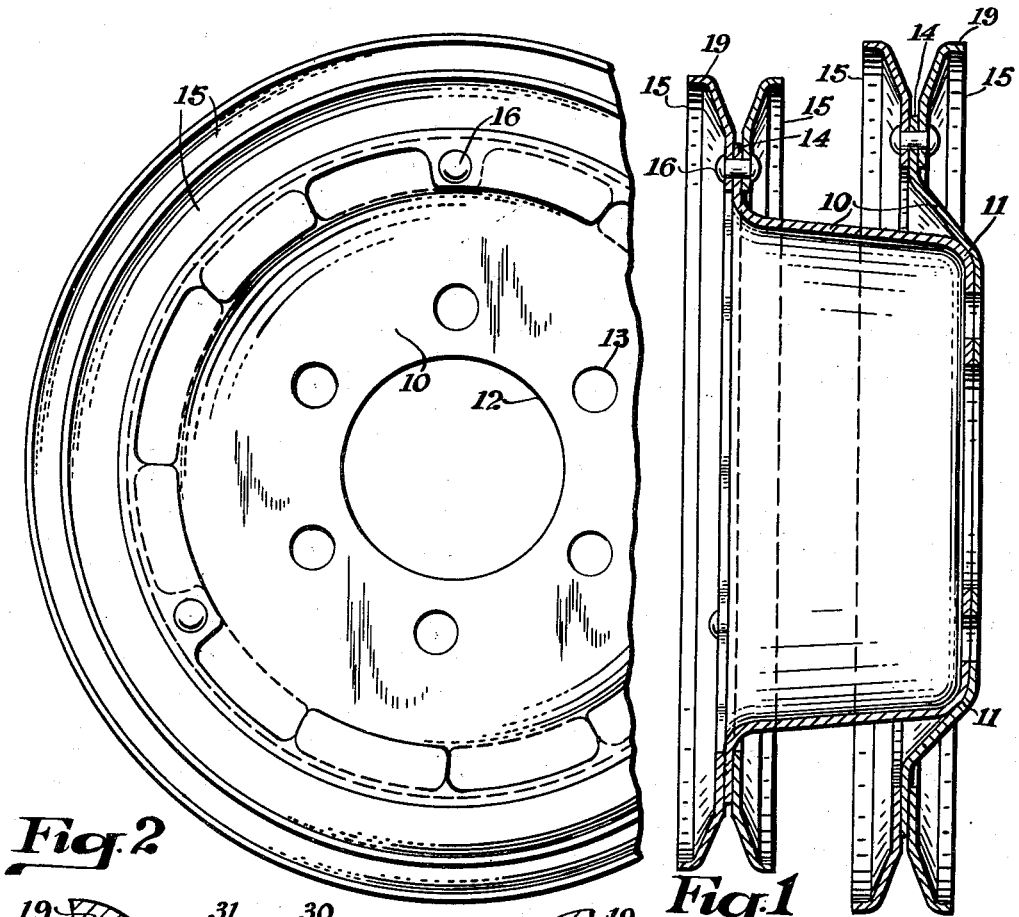
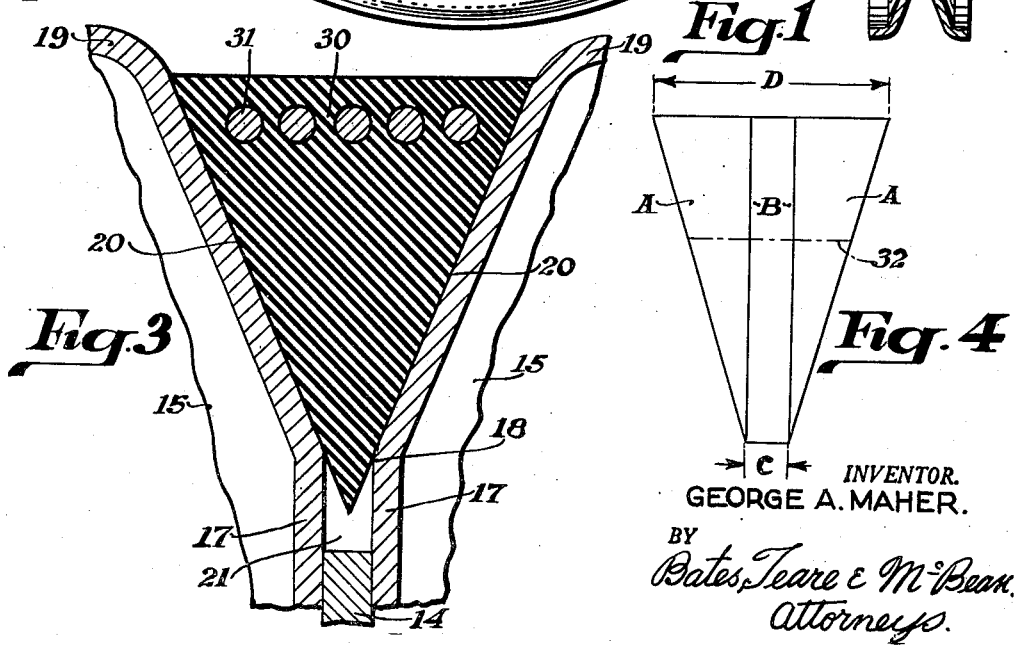
INVENTOR.
GEORGE A. MAHER.
BY
Bates, Teare & McBean,
Attorneys.

July 28, 1953  G. A. MAHER  2,646,689
BELT PULLEY
Filed March 7, 1946  3 Sheets-Sheet 3
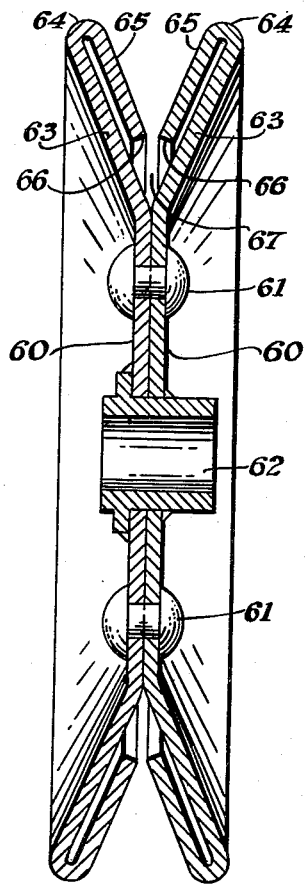
Fig. 9
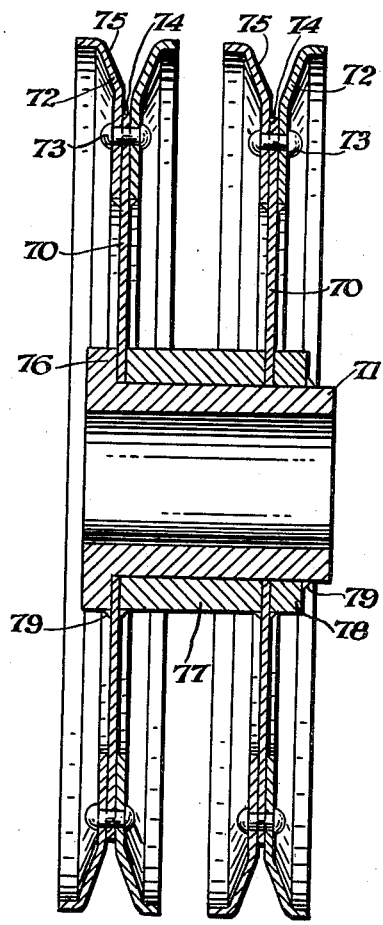
Fig. 10
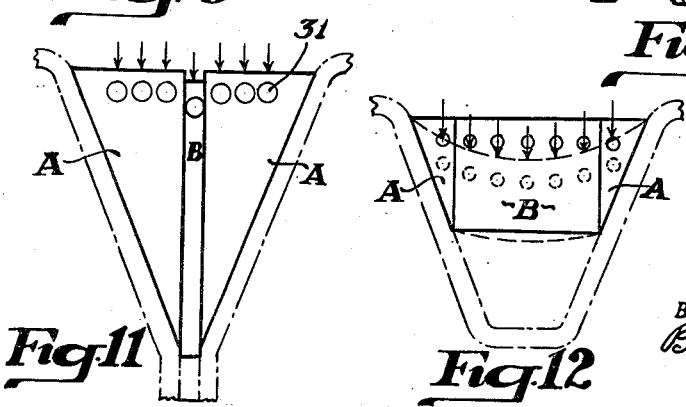
Fig. 11
Fig. 12
INVENTOR.
GEORGE A. MAHER.
BY Bates, Teare & McBean
Attorneys.

Patented July 28, 1953

2,646,689

UNITED STATES PATENT OFFICE 2,646,689

BELT PULLEY

George A. Maher, Detroit, Mich., assignor, by mesne assignments, to Gordon I. McNeil, Detroit, Mich.

Application March 7, 1946, Serial No. 652,562

3 Claims. (Cl. 74—230.8)

This invention relates to belt pulleys and more particularly to a sheet metal pulley designed to cooperate with a new form of V-belt.

In the art of making V-belts it has been found that decreasing the included angle of the sides of the V, that is, forming them at a steeper angle, produces a better gripping action between the belt and the pulley, and hence a better drive. In the usual forms of V-belts, which are of decidedly trapezoidal shape because the V is so truncated as to produce a width of inner base roughly two-thirds the width of the outer base, any increase in steepness of the sides reduces the pulley-supported regions of the cross-section, relative to the unsupported region, still further and to an undesirable degree.

However, to increase the driving action, and at the same time to increase the ratio of the supported area to the unsupported area, a V-belt may be so made that the sides come to a sharp, or nearly sharp, point at the apex. In such a case the included angle may be of any degree and yet at the same time the entire, or nearly the entire, cross-sectional area is directly supported.

Good results are obtained with such a belt, but the problem of wear arises, increasing with the steepness of the angle. The belt has a tendency to crowd down into the groove and, therefore, to have a sliding action into and out of the groove as it enters and leaves the pulley. As the belt wears to a smaller width, it operates lower in the groove and tends to drive only on its base, defeating the desired V-belt action.

An object of the present invention is to provide a pulley for cooperation with such a belt which will allow the enjoyment of the inherent advantages of the belt throughout its lifetime.

A further object is to provide such a pulley in a form which may be simply and economically constructed of sheet metal sections, welded or riveted together.

Other objects and advantages will be apparent from the following specification and claims and from the appended drawings.

Figure 6:
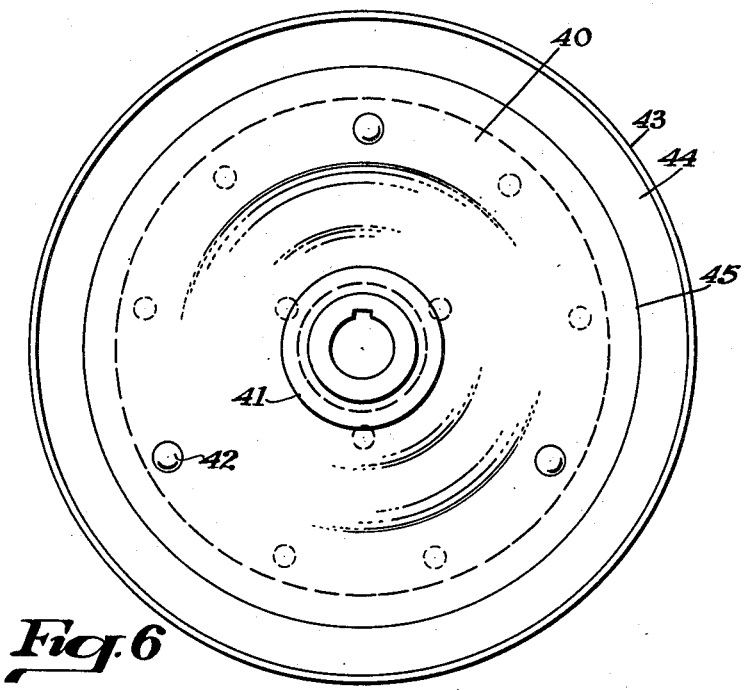
Figure 5:
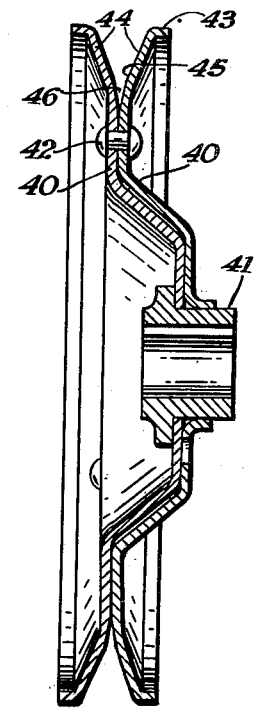
Figure 8:
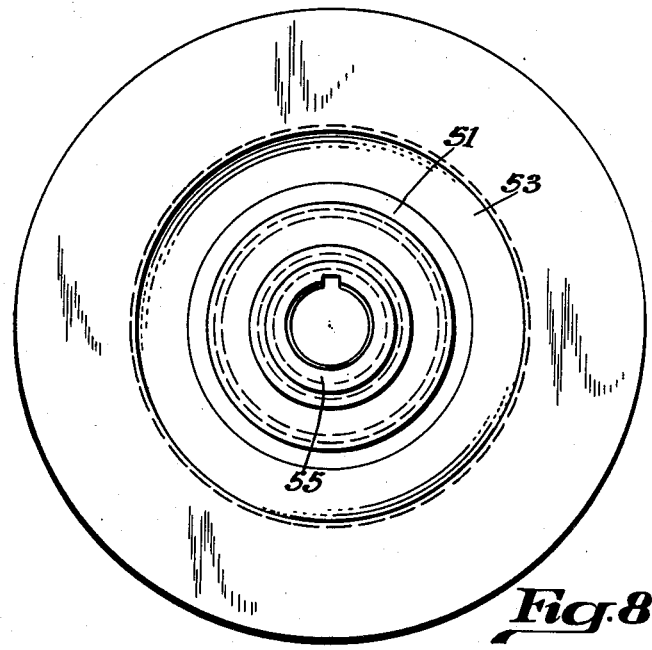
Figure 7:
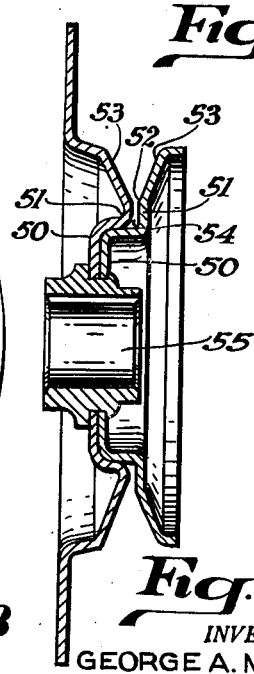

In the drawings, Fig. 1 is an axial section through a multiple pulley embodying my invention; Fig. 2 is an end elevation thereof; Fig. 3 is a fragmentary sectional view through a V-belt and pulley; Fig. 4 is a diagrammatic representation of the supported and unsupported areas of a belt; Fig. 5 is a view similar to Fig. 1 of a modified form of pulley; Fig. 6 is an end elevational view thereof; Figs. 7 and 8 are sectional and elevational views, respectively, of a further modified form; Figs. 9 and 10 are axial sections of two more modified forms of pulleys; Fig. 11 is a diagrammatic view of a V-belt and pulley illustrating, to an exaggerated degree, the deformation of the belt; and Fig. 12 is a similar view of a former type of V-belt and pulley.

In Figs. 1 and 2, I have illustrated a preferred form of my invention and have illustrated how two or more of such forms may be combined to produce a multiple pulley. Sheet metal hub members 10 may be drawn to cup shape of appropriate depth and secured, as by welding, in the region 11. A suitable clearance opening 12 and bolt holes 13 may be provided for attachment to a hub. Each member 10 is in the form of a cup having a plane bottom and an open rim. The cups are of different depth so that when the bottoms are secured together, in the position of Fig. 1, the rims are axially spaced apart. Each rim is turned outwardly to terminate at its periphery in an annular region 14 which defines a plane perpendicular to the axis of the pulley. Two annular sheet metal flanges 15 are riveted as at 16 to the region 14 of each hub member. The flanges are secured to opposite sides of the hub member and are thus spaced apart by the thickness of the metal. While I have shown two such cup-shaped pulley formations, it will be seen that any desired number may be so combined.

As best seen in the cross section of Fig. 3, the planular areas of the flanges 15 at the line of rivets continue radially outwardly beyond the periphery of the hub member, as illustrated at 17. At the point 18, actually a circle in end elevation, the flanges then are dished or flared outwardly in the form of truncated cones, and finally, at their peripheries, may be bent over parallel with the axis as at 19, thus providing strengthening ribs and rounded corners to prevent chafing of the belt.

It will be noted that the described formation of the flanges results in a V-shaped groove having straight converging sides at 20. It will also be noted that there is a resulting relief 21 at the bottom of the groove. As previously mentioned, a steep-angled V-belt, such as that shown at 30 with the usual row of cables or cords at 31, is subject to wear along its sides. The width of the belt thus decreases throughout its life, and the belt operates lower and lower in the groove. The relief at 21 prevents the bottoming of the belt and allows the latter to continue to function in its designed manner. It will be understood that the cross section of Fig. 3 is much larger than that of an automobile fan belt, for example, and that the ribbon-like portion which is formed as the belt wears, and which projects lower and lower into the relief 21, is of quite narrow width. This fragile ribbon tends to break from the belt and so, in practice, the belt does not bottom at the base of the relief.

It will be noted that, in addition to the increased wearing surface due to the larger area of contact, a more rigid support for the belt results from my pulley and belt arrangement. In Fig. 4 I have illustrated by the triangles A the portions of the belt which are directly supported by the pulley flanges, and by the rectangle B the portion which remains unsupported due to the width of the relief. I have found that satisfactory operation may be obtained with a width of relief C up to and including one-third of the outer width D of the belt, that is, satisfactory support for the belt is obtained by having the combined areas of the triangles A equal to or greater than the area B. This is to be compared with former types of V-belts of approximately the shape shown in Fig. 12 and the pulleys designed to cooperate therewith.

It is highly desirable to so support the cross-sectional area of the belt that the layer of cords or wires at 31 remains transversely straight. Where this layer is allowed to bow inwardly, as illustrated in Fig. 12, the individual cords are bent about different effective pulley circumferences and the outer cords are stretched to a much greater degree than is the central cord. Excessive friction and disruptive action is thereby occasioned, leading to premature failure of the belt.

This distortion of the cord layer is almost completely eliminated in a full V-belt supported by a pulley of my design, as may be seen in Fig. 11. Here only the thin rectangle B remains unsupported by the pulley. If there were no cohesive forces in the belt material this thin area would slip downwardly as shown. This, of course, does not occur and the shearing action is offset by the support of the two adjacent areas throughout the depth of the cross section. The layer of cords is thus maintained in substantially a straight transverse line and a longer life for the belt is assured.

In Fig. 5 I have illustrated a modified form of my invention in which I obtain the relief at the bottom of the groove in a different manner. Two sheet metal flanges 40 may be secured together, as by rivets 42, to form a double wall the central portion of which is formed as a tapered cup for greater rigidity. The bottom of the cup is provided with a suitable hub 41 and the rim of the cup is turned radially outwardly, the annulus thus formed being well adapted to receive the line of rivets. The peripheral regions beyond the annulus are flared apart and terminate in strengthening ribs 43 as before. A groove, V-shaped in cross section, is thus produced, the straight sides 44 of which converge at an acute angle. The straight sides, however, are diverted, at a point 45, short of their normal intersection, and from that point inwardly converge at a smaller angle. A relief for the apex of the belt is thus formed at 46.

Another embodiment of the invention is illustrated in Figs. 7 and 8 wherein two sheet metal flange members 50 are formed in cup shape at their centers. At the open rims of the cups the metal is turned radially outwardly for a substantial distance to form annular plane surfaces at 51. Then, at a point 52, the flanges are flared apart, as in the preceding forms, to provide a V-shaped groove with straight sides 53. The depths of the cups are so proportioned that when the inner cup is nested within the outer, as shown in Fig. 7, a space 54 is left between the two plane annular portions 51, thus providing an open bottom for the V-groove for the purposes previously described. An appropriate hub 55 may be used which has a shoulder against which the cup bottoms are drivingly clamped by means of a spun-over second shoulder.

In the modification of Fig. 9, two circular sheet metal members 60 are secured together, as by rivets 61, and are provided with a suitable hub 62. The peripheral regions beyond the line of rivets diverge at an acute angle, at 63, and then bend inwardly toward each other and back upon themselves, at 64, to form double walls, the bent back sections 65 of which converge at an acute angle to form a V-shaped groove. The sections 65 do not meet but terminate in edges 66 short of the meeting point. A space is thus left between them and a cavity is formed below them at 67 into which the apex of a belt may project as the belt wears in use.

In Fig. 10 I have illustrated a manner in which a multiple pulley may be readily and economically manufactured. The individual pulleys comprise sheet metal hub sections 70 of plane, circular form with central openings for the accommodation of a shouldered sleeve 71. The belt groove and the relief therefor are obtained, in the same manner as that shown in Fig. 1, by means of annular sheet metal flanges 72 riveted to opposite sides of the hub member. They extend radially a substantial distance beyond the latter to form a parallel-sided groove 74 and then diverge to form the V-groove 75. Two pulleys are shown in Fig. 10, but it will be apparent that any number desired may be assembled on a sleeve of suitable length. The first hub section 70 may rest against a shoulder 76 of the sleeve and, thereafter, spacing rings 77 and additional pulleys may be assembled alternately, the last pulley being followed by an end ring 78. The various parts may then be welded or brazed together as at 79 to produce a rigid structure.

It will be noted that in all the forms shown a relief is formed at the bottom of the V-groove by diverting the converging sides of the groove to converge at an algebraically smaller angle. This angle may be only slightly smaller than that of the groove, as illustrated in Fig. 5; it may be substantially zero, as illustrated in Figs. 1, 7 and 10; or it may be a negative converging angle, that is, a diverging one, as illustrated in Fig. 9.

While I have illustrated specific embodiments of my invention, it will be apparent that numerous changes and modifications may be made without departing from its spirit and scope as defined in the appended claims.

I claim:

1. A belt pulley comprising two circular sheet metal members having parallel inner portions connected at their outer ends to cylindrical portions extending in the same direction, one of such cylindrical portions nesting within the other, and an integral flange on each member axially spaced from each other, said flanges comprising inner substantially plane annular regions and outer diverging regions whereby a substantially parallel-sided groove is provided which opens outwardly into a V-shaped groove.

2. A pulley for coaction with a V-belt comprising a hub member, two circular sheet metal members having planular annular portions in face contact with each other and secured to the hub member and each having a cylindrical portion, which cylindrical portions nest snugly one within the other, and an integral flange on each member axially spaced from each other, said flanges comprising inner substantially plane annular regions and outer diverging regions whereby a substantially parallel-sided groove is provided which opens outwardly into a V-shaped groove, the outer width of the first named groove being less than one-third the normal outer top width of the V-groove.

3. A belt pulley comprising two sheet metal members and a hub, the members comprising telescoping cylindrical cups having open rims and plane bottoms adapted to receive the hub, the hub having two shoulders to drivingly clamp the bottoms, the inner cup being longer than the outer cup whereby the open rims are axially spaced, said rims being turned radially outwardly a substantial distance and then diverging at an acute angle to provide a V-shaped groove, the axial spacing of the rims providing an open bottom for the groove.

GEORGE A. MAHER.

References Cited in the file of this patent

UNITED STATES PATENTS

| Number | Name | Date |
|---|---|---|
| 355,555 | Radford | Jan. 4, 1887 |
| 940,106 | Wulff | Nov. 16, 1909 |
| 1,266,579 | Garcelon | May 21, 1918 |
| 1,634,438 | Spreen | July 5, 1927 |
| 1,740,087 | Hall | Dec. 17, 1929 |
| 2,060,322 | Johnson | Nov. 10, 1936 |
| 2,062,629 | Zimic | Dec. 1, 1936 |
| 2,156,920 | Mitchell | May 2, 1939 |

FOREIGN PATENTS

| Number | Country | Date |
|---|---|---|
| 19,611 | Great Britain | 1914 |